United States Patent

Holstein et al.

[11] Patent Number: 6,037,284
[45] Date of Patent: *Mar. 14, 2000

[54] MINERAL FIBRES WHICH CAN DISSOLVE IN A PHYSIOLOGICAL MEDIUM

[75] Inventors: Wolfgang Holstein, Homberg; Peter Lohe, Mutterstadt; Wolfgang Schwab, Plankstadt, all of Germany; Alain DeMeringo, Paris; Sylvie Thelohan, Fontenay-sous-Bois, both of France

[73] Assignee: Isover Saint-Gobain, Courbevoie, France

[ * ] Notice: This patent is subject to a terminal disclaimer.

[21] Appl. No.: 08/167,807

[22] PCT Filed: Apr. 22, 1993

[86] PCT No.: PCT/FR93/00393

§ 371 Date: Jun. 22, 1994

§ 102(e) Date: Jun. 22, 1994

[87] PCT Pub. No.: WO93/22251

PCT Pub. Date: Nov. 11, 1993

[30] Foreign Application Priority Data

Apr. 23, 1992 [FR] France ................... 92 04982

[51] Int. Cl.⁷ .................................. C03C 13/06
[52] U.S. Cl. ............................ 501/35; 501/36
[58] Field of Search ........................... 501/35, 36

[56] References Cited

U.S. PATENT DOCUMENTS

| | | | |
|---|---|---|---|
| 5,108,957 | 4/1992 | Cohen et al. | 501/35 |
| 5,250,488 | 10/1993 | Thelohan et al. | 501/36 |
| 5,332,698 | 7/1994 | Nyssen et al. | 501/35 |
| 5,332,699 | 7/1994 | Olds et al. | 501/38 |
| 5,401,693 | 3/1995 | Bauer et al. | 501/35 X |
| 5,843,854 | 12/1998 | Karppinen et al. | 501/70 |

FOREIGN PATENT DOCUMENTS

| | | |
|---|---|---|
| 0459897 | 12/1991 | European Pat. Off. . |
| 2662687 | 12/1991 | France .......... 501/36 |
| 2220654 | 1/1990 | United Kingdom . |
| 9002713 | 3/1990 | WIPO . |
| 9209536 | 6/1992 | WIPO . |

*Primary Examiner*—Karl Group
*Attorney, Agent, or Firm*—Oblon, Spivak, McClelland, Maier & Neustadt, P.C.

[57] ABSTRACT

The present invention relates to mineral fiber composition which can dissolve in contact with a physiological medium. The composition of these fibers includes the following components, in accordance with the following proportions by weight:

| | |
|---|---|
| $SiO_2$ | 48 to 67% |
| $Al_2O_3$ | 0 to 8% |
| $Fe_2O_3$ | 0 to 12% |

(total iron expressed in this form)

| | |
|---|---|
| CaO | 16 to 35% |
| MgO | 1 to 16% |
| $Na_2O + K_2O$ | 0 to 6.5% |
| $P_2O_5$ | 0 to 5% | taking into consideration that these compositions are also defined by the fact that the contents of these components comply with the following ratios:

$Na_2O+P_2O_5 \geq 2\%$ $Fe_2O_3+Al_2O_3 \leq 12\%$ $CaO+MgO+Fe_2O_3 \geq 23\%$.

12 Claims, No Drawings

MINERAL FIBRES WHICH CAN DISSOLVE IN A PHYSIOLOGICAL MEDIUM

The present invention relates to mineral fibres; more specifically it concerns mineral fibres of which the composition is such that they degrade as soon as they come into contact with a physiological medium.

Thermal and acoustic insulation of buildings is often produced from products which consist substantially of mineral wool, such as rock wool. The specific layout of the places to be insulated often leads people responsible for laying these products to cut them on the spot. This operation gives rise to breakages of the fibres, and can lead to dispersion of some of them in the atmosphere. A fibre can thus be inhaled accidentally.

Users have become aware of this risk, and it is desirable to provide them with replacement fibrous products, which, although they have the required insulation properties, can easily be dissolved by living tissue. This capacity for dissolving in a human organism is generally assessed by measuring the dissolving speed of the fibres in a solution which simulates an extracellular fluid.

The object of the present invention is mineral fibres which dissolve quickly in such a solution, but which maintain good mechanical resistance when they are subjected to heat.

This object is achieved by means of fibres, of which the composition comprises the following components, of which the content is expressed as a percentage by weight, in accordance with the limitations defined hereinafter;

| | |
|---|---|
| $SiO_2$ | 48 to 67% |
| $Al_2O_3$ | 0 to 8% |
| $Fe_2O_3$ (total iron expressed in this form) | 0 to 12% |
| CaO | 16 to 35% |
| MgO | 1 to 16% |
| $Na_2O + K_2O$ | 0 to 6.5% |
| $P_2O_5$ | 0 to 5% | taking into consideration that these compositions are also defined by the fact that the contents of these components comply with the following ratios:

$Na_2O+P_2O_5 \geq 2\%$ $Fe_2O_3+Al_2O_3 \leq 12\%$ $CaO+MgO+Fe_2O_3 \geq 23\%$

According to the present invention, the presence of alkaline oxides, in particular $Na_2O$, and/or the presence of phosphorous pentoxide in the composition of the mineral fibres previously defined, enables their dissolving speed in a solution which simulates an extracellular fluid to be increased.

Furthermore, an excessively high content of alkaline oxides, in particular $Na_2O$, detracts from satisfactory mechanical resistance of the mineral fibres according to the invention when they are subjected to heat.

For these reasons the mineral fibres contain at least 2 weight % $Na_2O$ and or phosphorous pentoxide, the sum of the alkaline oxides not exceeding 6.5 weight %. According to the preferred limits, the sum of the alkaline oxides is between 1 and 6%.

Silica is a component which decreases the speed at which the fibres dissolve. If its content by weight is high, this negative effect must be counterbalanced by increasing the components which promote dissolving of the fibres, such as for example $Na_2O$, by increasing the alumina content or by introducing phosphorous pentoxide into the composition. However, as previously stated, there is a limit to this increase. For this reason the $SiO_2$ content must not exceed 67%.

Iron oxides, expressed only in the form $Fe_2O_3$, as well as alumina, play a part in the dissolving speed. An excess of one and/or the other decreases the speed at which the fibres dissolve. A high dissolving speed can be maintained when the sum of the contents of these two oxides remains less than 12%, provided that the alumina content does not exceed 8%.

Although $Al_2O_3$ and iron oxides are not essential in the fibres according to the invention, their presence in the composition improves the mechanical resistance thereof, together with the addition of alkaline earth oxides.

The mineral fibres according to the invention thus have good mechanical resistance when they are subjected to heat, owing in particular to the fact that the composition includes lime, magnesium and iron oxides in proportions such that the sum of the contents of these oxides exceeds 23%, and preferably 25%.

The fibres according to the invention advantageously comprise the components listed hereinafter, in accordance with the following proportions by weight:

| | |
|---|---|
| $SiO_2$ | 50 to 66% |
| $Al_2O_3$ | 0 to 7% |
| $Fe_2O_3$ | 0 to 11% |
| CaO | 16 to 35% |
| MgO | 3 to 16% |
| $Na_2O + K_2O$ | 1 to 6% |
| $P_2O_5$ | 0 to 5% |
| with $CaO + MgO + Fe_2O_3 > 25\%$ | |

In general the most advantageous fibres according to the invention, which comply with any of the preceding definitions, comprise less than 4% $Al_2O_3$.

When the $Fe_2O_3$ content of the fibres according to the invention is equal to or more than 7%, their $Al_2O_3$ content is preferably equal to or less than 1%.

When the $Fe_2O_3$ content of the fibres according to the invention is equal to or more than 7%, their $P_2O_5$ content is preferably more than 1%.

The advantages of the fibres according to the invention will be better appreciated by means of the following detailed description, illustrated by some examples.

The attached tables include various compositions of mineral fibres which correspond to the definition of the invention, as well as a composition provided by way of comparative components.

The fibres which correspond to the compositions shown in table 1 are obtained from a fluid drawing device of the type described in patents U.S. Pat. Nos. 3,532,479 and 4,961,695.

The range of the diameters of the fibres tested, corresponding to examples no. 1 to 8, is such that 50% of them have a diameter smaller respectively than 2.2 µm–2.5 µm–3.1 µm–3.7 µm–3.5 µm–3.4 µm–3.7 µm.

The capacity of these fibres to be dissolved in a physiological environment is measured in the following experimental conditions: two hundred mg of fibres are placed between two perforated discs, separated by an annular ring. These two discs, of which the diameter is 4.3 cm, are covered by a polycarbonate filter. This assembly constitutes a measuring cell through which there circulates a solution which simulates an extracellular fluid, of which the flow rate is regulated by a peristaltic pump. This flow rate is 40 ml per day, the duration of the test being 42 hours. The cell and the flask which contain the attack solution are maintained at 37° C. After passing through the cell, the attack solution is collected in bottles, for subsequent analysis.

The quantity of silica which has passed through the solution is measured by analysis; the weight of silica dissolved relative to the silica originally present in the fibre provides a percentile result which is a good indicator of the capacity of the fibre tested to dissolved in a physiological medium.

The attack solution selected has a composition in which the content of each component is expressed in g/l:

| | |
|---|---|
| $MgCl_2.6H_2O$ | 0.212 |
| NaCl | 6.415 |
| $Na_2HPO_4$ | 0.148 |
| $Na_2SO_4.2H_2O$ | 0.179 |
| $CaCl_2.4H_2O$ | 0.318 |
| $NaHCO_3$ | 2.703 |
| ($Na_2$ tartrate).$2H_2O$ | 0.180 |
| ($Na_3$ citrate).$5.5H_2O$ | 0.186 |
| Na lactate | 0.175 |
| Na pyruvate | 0.172 |
| Glycine | 0.118 |

Additionally, the mechanical resistance of the fibres tested after being subjected to heat, is measured in the following conditions: a cubic sample of fibres, which has a density of approximately 100 kg/m$^3$, is placed in a tubular oven, of which the programmed temperature increase is 5° C. per minute. The collapse of the sample is measured by optical observation. The temperature at which the sample collapses by 10% was selected as the evaluation criterion for the mechanical resistance of the fibres tested. The various results for dissolving of the fibres tested and their mechanical resistance, are listed in tables 2 and 3 respectively.

The composition which acts as a comparison criterion corresponds to example no. 1. A conventional basalt composition is involved, in which the iron oxide and alumina contents are high.

The composition which corresponds to example no. 2 shows the fibres according to the invention, in which the high silica content is compensated by the addition of $Na_2O$. Although the dissolving speed of the corresponding fibres is high, their mechanical resistance is lower than that of the basalt.

The fibres of which the composition corresponds to example no. 3 have slightly better mechanical resistance than the above, but their dissolving speed is slightly slower, probably owing to the iron oxide content. This decrease in the dissolving speed is substantially compensated by the introduction of $P_2O_5$, as shown in example no. 4. This dissolving speed can be increased considerably by maintaining or by improving the temperature resistance, as shown in example no. 5.

Amongst the fibres which comply with the above-described general definition of the invention, those which have a good compromise between the highest dissolving speeds and levels of mechanical resistance, are those of which the $SiO_2$ content is between 52 and 62%, the magnesium content being at least 3% and the alkaline oxide content being between 1 and 5%.

The fibres according to the invention, of which the CaO, MgO and $Fe_2O_3$ content is such that the sum of these constituents is equal to or greater than 32%, have a temperature corresponding to a 10% collapse which is at least equal to that of the basalt.

The compositions of these fibres are shown in examples no. 5 and 6.

Table 4 shows other compositions which correspond to the invention. The capacity of these glasses to be dissolved in a physiological medium is measured by means of a test performed on glass crushed mechanically, in the following conditions:

the grains of glass obtained by crushing are screened and the granulometric fraction between 355 and 400 μm is retained for the test. The grains thus selected are washed in alcohol and dried in an oven. 1 g of this glass powder is placed in a cell identical to that previously described;

the contents of NaCl and $CaCl_2$, which are respectively 6.6 and 0,022 g/l, differ slightly from those of the previous solution. The solution additionally comprises 1.08 g/l formaldehyde;

the flow rate of this solution is 300 ml per day, and the duration of the test is two weeks, with intermediate measurements of one day and one week.

In table 4, example 1 which acts as a reference, is identical to that in table 1. At the end of one day, the attack on the glasses 9 to 11 is much greater than that on the reference glass, but the effect of the composition is not shown at such an early age in the attack.

The same no longer applies at the end of a week. The increase in the $Fe_2O_3$ content is probably the cause of the decrease in the quantity of silica, but surprisingly this decrease is relatively slight. With a 10% content of $Fe_2O_3$, the glass in example 11 is still approximately ten times more soluble than the reference glass.

Glasses 12 and 13 show that the introduction of $P_2O_5$ and the almost complete elimination of $Al_2O_3$ enable high dissolving speeds to be obtained, despite the high content of $Fe_2O_3$ and absence of alkaline oxides.

Glasses no. 15 to 17 are intermediate variants as far as the $Fe_2O_3$ and $Al_2O_3$ contents are concerned, but with alkaline oxides.

Glass no. 14 shows compositions without iron oxide, and which have a high dissolving speed despite their large content of $Al_2O_3$.

Amongst the fibres according to the invention which comply with the general definition of the invention, a category of preferred compositions corresponds to those defined by a phosphorous pentoxide content of between 1 and 4%.

The glasses according to the invention can be transformed into fibres by known external centrifuging devices, such as those described for example in patents U.S. Pat. No. 2,663,051, EP-A-0.167.508 or FR-A-2.609.708.

The fibres thus obtained enable fibrous products of excellent quality to be obtained which are suitable for numerous applications. Thus for example fibres according to the invention are advantageously used in the form of geometrically well-defined panels, stiffened by a polymerised binder, or in the form of tubular products to be used for insulation of pipes. The fibres according to the invention can also be used as padding in the form of mats attached to cardboard or wire netting, or even loose as a filler.

TABLE 1

(compositions in percentage by weight)

| Components | ex n° 1 | ex n° 2 | ex n° 3 | ex n° 4 | ex n° 5 | ex n° 6 | ex n° 7 | ex n° 8 |
|---|---|---|---|---|---|---|---|---|
| $SiO_2$ | 46.5 | 64.5 | 61.4 | 58.1 | 60.7 | 61.3 | 51.2 | 55.5 |
| $Fe_2O_3$ | 12.5 | 0.43 | 6.1 | 7 | 1 | 1 | 4.5 | 3 |
| $Al_2O_3$ | 13.4 | 0.77 | 0.2 | 0.2 | 0.3 | 0.3 | 3.5 | 3 |
| CaO | 10.6 | 19.4 | 18.6 | 18.4 | 28.1 | 20.85 | 26 | 29.6 |
| MgO | 9.4 | 8.5 | 8.8 | 9 | 6.4 | 14.6 | 11 | 6.5 |
| $Na_2O$ | 3.1 | 6 | 4.5 | 4.5 | 1.2 | 0.05 | 0.3 | 1.1 |
| $K_2O$ | 1.4 | 0.1 | 0.2 | 0.1 | 0.55 | 0.06 | 0.4 | 0.6 |
| $P_2O_5$ | 0.43 | 0.15 | 0.1 | 2.6 | 2.6 | 2.6 | 2.8 | 0.1 |
| $TiO_2$ | 2.65 | 0.1 | 0.05 | 0.1 | 0.12 | 0.13 | 0.2 | 0.5 |

TABLE 2

(Quantity of $SiO_2$ dissolved as percentage)

| Attack Time | ex n° 1 | ex n° 2 | ex n° 3 | ex n° 4 | ex n° 5 | ex n° 6 | ex n° 7 | ex n° 8 |
|---|---|---|---|---|---|---|---|---|
| 42 days | 3.5 | 27 | 21.9 | 33.8 | 43.2 | 36.5 | 24.3 | 14.2 |

TABLE 3

(Temperature corresponding to a collapse of 10%)

| | ex n° 1 | ex n° 2 | ex n° 3 | ex n° 4 | ex n° 5 | ex n° 6 | ex n° 7 | ex n° 8 |
|---|---|---|---|---|---|---|---|---|
| Temperature in ° C. | 720 | 680 | 690 | 690 | 730 | 750 | — | — |

TABLE 4

(compositions in percentage by weight)

| Components | ex n° 1 | ex n° 9 | ex n° 10 | ex n° 11 | ex n° 12 | ex n° 13 | ex n° 14 | ex n° 15 | ex n° 16 | ex n° 17 | ex n° 18 |
|---|---|---|---|---|---|---|---|---|---|---|---|
| $SiO_2$ | 46.5 | 61.4 | 59.4 | 57.3 | 53.8 | 50.2 | 61.0 | 61.3 | 59.9 | 60.2 | 60.6 |
| $Fe_2O_3$ | 12.5 | 6.1 | 8.0 | 10.0 | 8.0 | 11.8 | 0.1 | 5.0 | 8.1 | 1.9 | 1 |
| $Al_2O_3$ | 13.4 | 0.2 | 0.2 | 0.2 | 0.1 | 0.1 | 6.5 | 3.9 | 3.9 | 6.4 | 6.4 |
| CaO | 10.6 | 18.6 | 18.6 | 18.3 | 24.9 | 25.0 | 21 | 18.0 | 16.8 | 20.2 | 20.4 |
| MgO | 9.4 | 8.8 | 9.1 | 9.3 | 10.0 | 9.8 | 4.0 | 3.8 | 3.2 | 3.9 | 4 |
| $Na_2O$ | 3.1 | 4.5 | 4.3 | 4.5 | 0.02 | 0.02 | 4.9 | 4.8 | 4.9 | 2.4 | 2.8 |
| $K_2O$ | 1.4 | 0.2 | 0.15 | 0.2 | 0.05 | 0.05 | 0.1 | 0.1 | 0.1 | 1.6 | 1.9 |
| $P_2O_5$ | 0.43 | 0.1 | 0.1 | 0.1 | 3.0 | 3.0 | 2.4 | 3.0 | 3.0 | 2.9 | 2.8 |
| $TiO_2$ | 2.65 | 0.05 | 0.1 | 0.12 | 0.14 | 0.14 | 0.1 | 0.1 | 0.1 | 0.4 | 0.1 |

TABLE 5

(Quantity of $SiO_2$ dissolved as percentage)

| Attack Time | ex n° 1 | ex n° 9 | ex n° 10 | ex n° 11 | ex n° 12 | ex n° 13 | ex n° 14 | ex n° 15 | ex n° 16 | ex n° 17 | ex n° 18 |
|---|---|---|---|---|---|---|---|---|---|---|---|
| 1 Day | 0.015 | 0.068 | 0.098 | 0.075 | 0.246 | 0.121 | 0.218 | 0.083 | — | — | — |
| 1 Week | 0.065 | 0.84 | 0.72 | 0.62 | 1.63 | 0.96 | 2.55 | 1.04 | 0.77 | 0.99 | 1.52 |
| 2 Weeks | <0.1 | | | | | | 5.43 | 2.01 | — | — | — |

We claim:

1. A mineral fiber, which dissolves in a physiological medium, comprising by weight percent:

| $SiO_2$ | 48 to 67% |
| $Al_2O_3$ | 0.2 to 3% |
| $Fe_2O_3$ | 0 to 12% (as total iron) |
| CaO | 16 to 35% |
| MgO | 1 to 16% |
| $Na_2O + K_2O$ | 1 to 6.5% |
| $P_2O_5$ | 0.1 to 2.6% | and wherein the contents of these components further comply with the following:

$Na_2O+P_2O_5 \geq 1.2\%$ $Fe_2O_3+Al_2O_3 \leq 12\%$ $Al_2O_3+P_2O_5$ 0.3 to 3.1% and $CaO+MgO+Fe_2O_3 \geq 23\%$.

2. A thermal or acoustic insulation material, consisting essentially of a mineral fiber, which dissolves in a physiological medium, comprising by weight percent:

| $SiO_2$ | 48 to 67% |
| $Al_2O_3$ | 0.2 to 3% |
| $Fe_2O_3$ | 0 to 12% (as total iron) |
| CaO | 16 to 35% |
| MgO | 1 to 16% |
| $Na_2O + K_2O$ | 1 to 6.5% |
| $P_2O_5$ | 0.1 to 2.6% | and wherein the contents of these components further comply with the following:

$Na_2O+P_2O_5 \geq 1.2\%$ $Fe_2O_3+Al_2O_3 \leq 12\%$ $Al_2O_3+P_2O_5$ 0.3 to 3.1% and $CaO+MgO+Fe_2O_3 \geqq 23\%$.

3. The mineral fiber of claim 1, which comprises 50 to 66% of $SiO_2$, 0 to 11% of $Fe_2O_3$ (total iron), 3 to 16% of MgO, 1 to 6% of $Na_2O+K_2O$ and an amount of greater than 25% of $CaO+MgO+Fe_2O_3$.

4. The mineral fiber of claim 1, having a content of $Al_2O_3 \leqq 1\%$, when the content of $Fe_2O_3$ thereof is $\geqq 7\%$.

5. The mineral fiber of claim 1, wherein the content of $Na_2O$ and $K_2O$ is between 1 and 6%.

6. The mineral fiber of claim 1, which has a $SiO_2$ content of between 52 and 62%, a MgO content of at least 3% and content of $Na_2O$ and $K_2O$ of between 1 and 5%.

7. The mineral fiber of claim 1, having a content of CaO, MgO and $Fe_2O_3$ (total iron) greater than 32%.

8. The thermal or acoustic insulation material of claim 2, which comprises 50 to 66% of $SiO_2$, 0 to 11% of $Fe_2O_3$ (total iron), 3 to 16% of MgO, 1 to 6% of $Na_2O+K_2O$ and an amount of greater than 25% of $CaO+MgO+Fe_2O_3$.

9. The thermal or acoustic insulation material of claim 2, having a content of $Al_2O_3 \leqq 1\%$, when the content of $Fe_2O_3$ thereof is $\geqq 7\%$.

10. The thermal or acoustic insulation material of claim 2, having a content of CaO, MgO and $Fe_2O_3$ (total iron) greater than 32%.

11. The thermal or acoustic insulation material of claim 2, wherein the content of $Na_2O$ and $K_2O$ is between 1 and 6%.

12. The thermal or acoustic insulation material of claim 2, which has a $SiO_2$ content of between 52 and 62%, a MgO content of at least 3% and content of $Na_2O$ and $K_2O$ of between 1 and 5%.

* * * * *